United States Patent Office 3,523,951
Patented Aug. 11, 1970

3,523,951
1,3,4-THIADIAZOLE-5(4H)-ONE DERIVATIVES
Kurt Rufenacht, Basel, Switzerland, assignor to Geigy Chemical Corporation, Ardsley, N.Y., a corporation of New York
No Drawing. Filed Nov. 23, 1966, Ser. No. 596,445
Claims priority, application Switzerland, Dec. 1, 1965, 16,577/65
Int. Cl. C07f 9/24, 9/44
U.S. Cl. 260—306.7                            13 Claims

ABSTRACT OF THE DISCLOSURE

There are disclosed derivatives of 1,3,4-thiadiazole-5(4H)-one of the formula

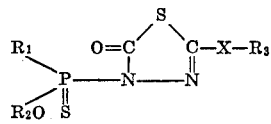

wherein

R is lower alkyl, lower alkoxy optionally substituted by lower alkoxy or halogen, or phenyl;
$R_2$ is lower alkyl optionally substituted by lower alkoxy or halogen;
$R_3$ is alkyl having from 1 to 6 carbons optionally substituted by lower alkoxy or lower alkylthio; and
X is oxygen or sulphur.

These compounds have fungicidal, insecticidal, acaricidal and nematocidal properties and are therefore useful for soil disinfection.

---

The present invention relates to new 1,3,4-thiadiazole-5(4H)-one derivatives and processes for their preparation. It also relates to new pesticidal compositions, such as soil disinfectant, acaricidal and insecticidal compositions, containing these new compounds, as well as to new processes for the disinfection of soil and for the combatting of pests, such as insects and acarinae, by using the new compounds or compositions containing them. It further relates to processes for the preparation of the novel compositions.

It has now been found that 1,3,4-thiadiazole-5(4H)-one derivatives of the general formula

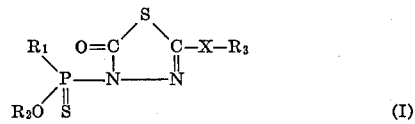     (I)

wherein $R_1$ represents a lower alkyl group, a lower alkoxy group which is optionally substituted by lower alkoxy or halogen, or a phenyl group,
$R_2$ represents a lower alkyl group optionally substituted by lower alkoxy or halogen,
$R_3$ in the general Formula I represents an aliphatic hydrocarbon be substituted, and
X represents oxygen or sulphur, have excellent fungicidal (soil), insecticidal, acaricidal and in particular nematocidal properties so that they are valuable, in particular, for soil disinfection. The new compounds are also suitable for combatting pests which threaten stores and health.

By lower alkyl groups symbolized by $R_1$ and $R_2$ in the general Formula I are meant those with 1 to 4 carbon atoms such as the methyl, ethyl, propyl, isopropyl, butyl, iso-butyl, secondary and tertiary butyl group. By lower alkoxy groups, which can be substituents on the lower alkoxy groups of $R_1$ or on the lower alkyl groups of $R_2$, are meant those with 1 to 4 carbon atoms such as the methoxy, ethoxy, propoxy, isopropoxy and butoxy group. When $R_1$ is a lower alkoxy-lower alkoxy group, groups such as methoxy-ethoxy, ethoxy-ethoxy, propoxy-ethoxy, isopropoxy-ethoxy, methoxy-propoxy, ethoxy-propoxy, propoxy-propoxy and isopropoxy-propoxy are meant. The term halogen stands for chlorine, bromine and fluorine.

$R_3$ in the general Formula I represents an aliphatic hydrocarbon group preferably an alkyl group having 1 to 6 carbon atoms. Such group can be further substituted e.g. by a lower alkoxy or a lower alkylthio group having from 1 to 4 carbon atoms.

Preferred compounds are those wherein $R_1$ is methyl, methoxy, ethoxy, isopropoxy, methoxy-ethoxy, chloroethoxy or phenyl; $R_2$ is methyl, ethyl, isopropyl, methoxy ethyl, or chloro ethyl; $R_3$ is lower alkyl with 1 to 6 carbon atoms; lower alkoxy-lower alkyl with a total number of carbon atoms of from 2 to 6; or lower alkylthio-lower alkyl with a total number of from 2 to 6 carbon atoms.

By "soil disinfection" is meant the destruction of insects and fungi living in the soil and in particular of nematodes.

The new 1,3,4-thiadiazole-5-(4H)-one derivatives of general formula I are obtained according to the invention by reacting a thiocarbazic acid ester of general Formula II:

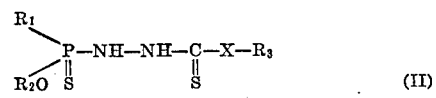     (II)

wherein $R_1$, $R_2$, $R_3$ and X have the meanings given in Formula I, with phosgene, the reaction being performed in the presence of a solvent or diluent which is inert to the reaction components and within a temperature range of 0° to 100° C. Phosgene is added to the reaction either as gas or dissolved in an inert solvent, at temperatures between 0° and 30° C. On completion of the addition of phosgene, the reaction mixture is heated to 30° to 100° C., preferably to 30° to 80°. The hydrogen chloride formed during the reaction can, if necessary, be bound by means of a tertiary amine such as triethylamine, pyridine, etc.

Suitable solvents or diluents for the process according to the invention are principally aromatic hydrocarbons such as benzene, toluene, xylene, or chlorinated hydrocarbons such as chlorobenzene and chloroform.

As thiocarbazic acid esters of general Formula II for the process according to the invention, the methyl, ethyl, n-propyl, isopropyl, 2-methoxyethyl, 2-ethoxyethyl, 2-isopropoxyethyl esters, the butyl, amyl and hexyl esters of the following monothiocarbazic acids can be used:

3-(dimethoxy-phosphinothioyl)-thiocarbazic acid,
3-(diethoxy-phosphinothioyl)-thiocarbazic acid,
3-(di-isopropoxy-phosphinothioyl)-thiocarbazic acid,
3-(bis-2'-methoxyethoxy-phosphinothioyl)-thiocarbazic acid,
3-(bis-2'-chlorethoxy-phosphinothioyl)-thiocarbazic acid,
3-(methylmethoxy-phosphinothioyl)-thiocarbazic acid,
3-(methylethoxy-phosphinothioyl)-thiocarbazic acid,
3-(phenylmethoxy-phosphinothioyl)-thiocarbazic acid,
3-(phenylethoxy-phosphinothioyl)-thiocarbazic acid, as well as of the following dithiocarbazic acids:

3-(dimethoxy-phosphinothioyl)-dithiocarbazic acid,
3-(diethoxy-phosphinothioyl)-dithiocarbazic acid,
3-(di-isopropoxy-phosphinothioyl)-dithiocarbazic acid, 3-(bis-2'-methoxy-ethoxy-phosphinothioyl)-dithiocarbazic acid,
3-(bis-2'-chlorethoxy-phosphinothioyl)-dithiocarbazic acid,
3-(methylmethoxy-phosphinothioyl)-dithiocarbazic acid,
3-(methylethoxy-phosphinothioyl)-dithiocarbazic acid,
3-(phenylmethoxy-phosphinothioyl)-dithiocarbazic acid,
3-(phenylethoxy-phosphinothioyl)-dithiocarbazic acid.

The esters of the monothiocarbazic acids are therefore always the O-esters.

The monothiocarbazic acid esters of Formula II are obtained by reacting a correspondingly substituted 2-phosphinothioyl hydrazide with a xathogenate of the general formula

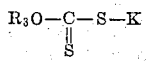

while splitting off potassium hydrogen sulphide, or by reacting such a hydrazide with a compound of the general formula

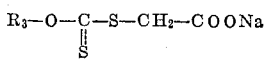

while splitting off thioglycolic acid. The dithiocarbazic acid esters are obtained direct by reacting a correspondingly substituted 2-phosphinothioyl hydrazine with carbon disulphide, potassium hydroxide and an alkylating agent, preferably an alkyl halide. The mono- and also the dithiocarbazic acid esters can be obtained by reacting a phosphinothioyl halide with a thio- or dithio- carbazic acid ester in the presence of an acid acceptor.

It is indeed known that thio- and dithio- carbazic acid esters unsubstituted in the 3-position can be cyclised with phosgene to form thiadiazolones. This is relatively easy to understand as the unsubstituted amino group of these carbazinates has a strongly basic character as is shown, for example, in the formation of salts with mineral acids and it is thus a suitable point of attack for the carbonic acid halide. [Guha and Guha, C.A. 21 3199[7]; Z. 1927 II 1705; J. Ind. Chem. Soc. 4, 239 (1927)].

In the 3-phosphinothioyl-thio- and dithio- carbazic acid esters of Formula II however, there are phosphorus amides not having basic properties so that no further reaction with an acid halide was to have been expected.

The ease of ring closure to form the claimed compounds of the Formula I by the action of a carbonic acid halide such as phosgene, therefore, could in no way have been expected.

In the purified state, the new thiadiazole-5-(4H)-one derivatives of general Formula I are colourless oils which dissolve well in organic solvents but are insoluble in water. The new compounds have only very slightly toxicity for plants and warm blooded animals, for which reason their use is of the greatest importance in the protection of plants and stores and also in combatting pests which threaten health.

The range of action of the active substances mentioned and, in particular, the insecticidal and acaricidal action, is improved by admixture with synergists and auxiliaries having a similar action such as succinic acid dibutyl ester, piperonyl butoxide, olive oil, peanut oil, etc. In the same way, the insecticidal action can be substantially widened and adapted to given circumstances by the addition of other insecticides such as the esters and amines of phosphoric acid, phosphonic acid, thio- and dithio-phosphoric acid, carbamic acid esters, halogenated hydrocarbons, analogues of DDT active substance, pyrethrins and synergists thereof.

The following examples serve to illustrate the process according to the invention. Where not otherwise stated, parts are given therein as parts by weight and the temperatures are in degrees Centigrade.

EXAMPLE 1

2-ethoxy-4-(diethoxy-phosphinothioyl)-1,3,4-thiadiazole-5-(4H)-one 715 parts by volume of a solution of phosgene in benzene containing 240 parts of phosgene, is added dropwise to a solution of 432 parts of 3-diethoxy-phosphinothioyl thiocarbazic acid-O-ethyl ester (M.P. 58–59°) in 800 parts by volume of anhydrous benzene while slightly cooling, the addition being made so quickly that the reaction temperature remains between 10 and 20°. The whole is stirred for 16 hours at room temperature and is then gradually heated within 1 hour to reflux temperature. After refluxing for 1 hour, the solvent is distilled off and 500 parts of water are added to the residue. The oil which separates out is taken up in ether, the ethereal solution is extracted first with dilute sodium bicarbonate solution and then with water and dried over sodium sulphate. After distilling off the ether, the residue is fractionated under high vacuum. 410 parts of 2-ethoxy-4-(diethoxy-phosphinothioyl)-1,3,4-thiadiazole-5(4H)-one distill at 120–122°/0.05 torr as a colourless oil (yield 86%).

EXAMPLE 2

2-methylthio-4-(diethoxy-phosphinothioyl)-1,3,4-thiadiazole-5(4H)-one 80 parts by volume of a solution of phosgene in benzene containing 20 parts of phosgene are added quickly, without external cooling to a slurry of 28 parts of 3-diethoxyphosphinothioyl-dithiocarbazic acid methyl ester (M.P. 104–105°) in 100 parts by volume of anhydrous benzene. The temperature of the mixture rises from 16° to 28° and, while gas is developed, first a yellow solution is formed which, however, becomes colourless after one hour. Excess phosgene and benzene are then distilled off under water jet vacuum. Further working up according to Example 1 yields 21 parts of 2-methylthio-4-(diethoxy-phosphinothioyl)-1,3,4-thiadiazole-5(4H)-one as a colourless oil. It boils at 123–124°/0.02 torr (yield 70%).

EXAMPLE 3

2-isopropoxy-4-(diethoxy-phosphinothioyl)-1,3,4-thiadiazole-5(4H)-one 170 parts of phosgene are introduced at 5 to 15° to a cooled solution of 355 parts of 3-diethoxy-phosphinothioyl-thiocarbazic acid-O-isopropyl ester (M.P. 81–82°) in 1000 parts by volume of anhydrous benzene. The whole is stirred for 2 hours at room temperature, then heated within 1 hour to reflux temperature whereupon it is refluxed for 1 hour. Further working up according to Example 1 yields 315 parts (81% yield) of 2-isopropoxy-4-(diethoxy-phosphinothioyl)-1,3,4-thiadiazole-5(4H) - one as a colourless oil. It boils at 124°/0.04 torr.

EXAMPLE 4

2-(2'-methoxy-ethoxy)-4-(dimethoxy-phosphinothioyl)-1,3,4-thiadiazole-5(4H)-one 33 parts of phosgene are introduced into a slurry of 69 parts of 3-dimethoxy-phosphinothioyl thiocarbazic acid-O-(2'-methoxy-ethyl)-ester (M.P. 67–68°) in 200 parts by volume of anhydrous benzene. The temperature rises to 30° and a clear, yellow solution is formed. The colour disappears on heating to reflux temperature. Further working up according to Example 1 yields 70 parts of 2-(2'-methoxy-ethoxy)-4-(dimethoxy-phosphinothioyl)-1,3,4-thiadiazole-5(4H)-one as a pale yellow oil which cannot be distilled without decomposition. Crude yield 93%.

The compounds of general Formula I

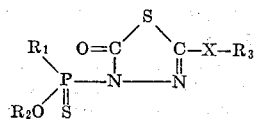

given in the following table are obtained by the methods described in Examples 1 to 4 by reacting the corresponding thio- or dithio-carbazic acid esters with phosgene:

The concentration of active substance in the agents according to the invention is between 0.01 and 80%, in particular between 10 and 80%. In addition to the active

| | $R_1$ | $R_2$ | $R_3$ | X | Boiling point or melting point | Yield in percent |
|---|---|---|---|---|---|---|
| 1 | $CH_3$ | $C_2H_5$ | $CH_3$ | O | Not distillable | |
| 2 | $CH_3$ | $C_2H_5$ | $CH_3$ | S | do | |
| 3 | $CH_3O$ | $CH_3$ | $CH_3$ | O | 104–106°/0.005 torr | 71 |
| 4 | $CH_3O$ | $CH_3$ | $C_2H_5$ | O | 115–117°/0.007 torr | 30 |
| 5 | $CH_3O$ | $CH_3$ | $n$-$C_3H_7$ | O | 131–132°/0.008 torr | 52 |
| 6 | $CH_3O$ | $CH_3$ | iso-$C_3H_7$ | O | 113–114°/0.005 torr | 70 |
| 7 | $CH_3O$ | $CH_3$ | $n$-$C_4H_9$ | O | 125°/0.001 torr | ¹ 85 |
| 8 | $CH_3O$ | $CH_3$ | $CH_3$ | S | 140–142°/0.02 torr | 37 |
| 9 | $CH_3O$ | $CH_3$ | $C_2H_5$ | S | 125°/0.001 torr | ¹ 94 |
| 10 | $CH_3O$ | $CH_3$ | $n$-$C_3H_7$ | S | do | ¹ 91 |
| 11 | $CH_3O$ | $CH_3$ | $CH_3O\,C_2H_4$ | S | 140°/0.005 torr | |
| 12 | $CH_3O$ | $CH_3$ | $C_2H_5O\,C_2H_4$ | S | 140°/0.01 torr | |
| 13 | $CH_3O$ | $CH_3$ | iso-$C_3H_7O\,C_2H_4$ | O | 130°/0.002 torr | ¹ 94 |
| 14 | $CH_3O$ | $CH_3$ | $CH_3S\,C_2H_4$ | S | | |
| 15 | $C_2H_5O$ | $C_2H_5$ | $CH_3$ | O | 115–116°/0.03 torr | 65 |
| 16 | $C_2H_5O$ | $C_2H_5$ | $n$-$C_3H_7$ | O | 128–130°/0.05 torr | 68 |
| 17 | $C_2H_5O$ | $C_2H_5$ | $n$-$C_4H_9$ | O | 131–132°/0.03 torr | 65 |
| 18 | $C_2H_5O$ | $C_2H_5$ | iso-$C_4H_9$ | O | 130–131°/0.015 torr | 72 |
| 19 | $C_2H_5O$ | $C_2H_5$ | sec.$C_4H_9$ | O | | ¹ 50 |
| 20 | $C_2H_5O$ | $C_2H_5$ | $n$-$C_5H_{11}$ | O | 137–139°/0.003 torr | 73 |
| 21 | $C_2H_5O$ | $C_2H_5$ | $n$-$C_6H_{13}$ | O | 156°/0.001 torr | 67 |
| 22 | $C_2H_5O$ | $C_2H_5$ | $C_2H_5$ | S | 133–134°/0.01 torr | 74 |
| 23 | $C_2H_5O$ | $C_2H_5$ | $n$-$C_3H_7$ | S | 125°/0.0005 torr | ¹ 95 |
| 24 | $C_2H_5O$ | $C_2H_5$ | iso-$C_3H_7$ | S | 126–127°/0.008 torr | 86 |
| 25 | $C_2H_5O$ | $C_2H_5$ | $CH_3O$—$C_2H_4$ | O | 142°/0.015 torr | 73 |
| 26 | $C_2H_5O$ | $C_2H_5$ | $C_2H_5O\,C_2H_4$ | O | 140°/0.005 torr | |
| 27 | $C_2H_5O$ | $C_2H_5$ | iso-$C_3H_7O\,C_2H_4$ | O | 140–142°/0.2 torr | 74 |
| 28 | $C_2H_5O$ | $C_2H_5$ | $CH_3O\,C_2H_4$ | S | 140°/0.005 torr | |
| 29 | $C_2H_5O$ | $C_2H_5$ | $C_2H_5O\,C_2H_4$ | S | 140°/0.01 torr | |
| 30 | $C_2H_5O$ | $C_2H_5$ | iso-$C_3H_7O\,C_2H_4$ | S | do | |
| 31 | $C_2H_5O$ | $C_2H_5$ | $C_2H_5S\,C_2H_4$ | S | | |
| 32 | $C_2H_5O$ | $C_2H_5$ | iso-$C_3H_7S\,C_2H_4$ | S | | |
| 33 | iso-$C_3H_7O$ | iso-$C_3H_7$ | $CH_3$ | O | 112–116°/0.015 torr | 88 |
| 34 | iso-$C_3H_7O$ | iso-$C_3H_7$ | iso-$C_3H_7$ | O | 122–124°/0.004 torr | 55 |
| 35 | iso-$C_3H_7O$ | iso-$C_3H_7$ | $CH_3$ | S | 50–51° | |
| 36 | iso-$C_3H_7O$ | iso-$C_3H_7$ | $CH_3S\,C_2H_4$ | S | | |
| 37 | $CH_3O\,CH_2CH_2O$ | $CH_3O\,CH_2CH_2$ | $CH_3$ | O | Not distillable | |
| 38 | $CH_3O\,CH_2CH_2O$ | $CH_3O\,CH_2CH_2$ | $CH_3S\,C_2H_4$ | S | | |
| 39 | $ClCH_2CH_2O$ | $ClCH_2CH_2$ | $CH_3$ | O | 135°/0.005 torr | |
| 40 | $ClCH_2CH_2O$ | $ClCH_2CH_2$ | $CH_3$ | S | Not distillable | |
| 41 | — | $C_2H_5$ | $CH_3$ | S | do | |
| 42 | — | $C_2H_5$ | iso-$C_3H_7$ | S | 135°/0.005 torr | |

¹ Crude.

Both for soil disinfection and for the combatting of insects and spiders, the new active substances are used in the form of solid or liquid agents. Those agents are particularly suitable for soil disinfection which ensure an even distribution of the active substance throughout a layer of earth 15 to 25 cm. deep. In addition, application can be restricted to dibbler holes and furrows, in which case a sufficient protective action is attained with a reduced amount of active substance. The new active substances are stable, cause no irritation to skin and mucous membranes and so can be applied to the earth to be treated, e.g. by mixing therewith, pouring thereon, injection, etc., in the form of sprinkling agents, granulates, dispersions and solutions. The mode of application and form of agent depend particularly on the type of soil meant to be combatted, the climate and earth conditions. As the new active substances are not phytotoxic and do not have an adverse effect on the germination of seeds, they can be applied without consideration of a so-called waiting time and in already established crops.

To combat insects and spiders, the active substances of the general Formula I are applied in the form of dusts or sprinkling agents, granulates, dispersions, solutions and aerosols. The soil disinfectants and insecticidal agents according to the invention are produced in the known way by intimately mixing and milling the active substances with suitable carriers, optionally with the addition of dispersing agents or solvents which are inert to the active substances. The dispersions mentioned in the above text are obtained from concentrates of active substance such as wettable powders, pastes, emulsions, by dilution with water to the concentration of active substance desired for use.

substances, such agents can also contain other biocidal active substances such as other nematicides, fungicides and insecticides, also bactericides, fungistatics, bacteriostatics, etc.

For soil disinfection, substances having great water and citrate solubility, fertilisers, plant growth promoting substances or herbicides, can be admixed in the solid application forms. For this purpose, it is also of advantage to use halogenated hydrocarbons as solvent such as 1,2-dibromo - 3 - dichloropropene, mixtures of 1,2 - dichloropropane and 1,3 - dichloropropene, the instantaneous nematocidal action of which is valuable complement to the long lasting action of the active substances according to the invention.

The following forms for application serve to illustrate the present invention; where not otherwise stated, parts are given as parts by weight.

DUST

To produce (a) a 10% and (b) a 2% dust, the following substances are use:

(a)

10 parts of 2-ethoxy-4-(diethoxy-phosphinothioyl)-1,3,4-thiadiazole-5(4H)-one,
5 parts of highly dispersed silicic acid,
85 parts of talcum.

(b)

2 parts of 2-methylthio-4-(diethoxy-phosphinothioyl)-1,3,4-thiadiazole-5(4H)-one,
1 part of highly dispersed silicic acid,
97 parts of talcum.

The active substances are mixed and milled with the carriers. The dusts obtained are suitable e.g. for combatting cockroaches and ants in houses. To disinfect soil, these dusts can also be worked into the soil.

SPRINKLING AGENT

To produce a 25% sprinkling agent, the following substances are used:

0.25 part of an emulsifying combination (alkylarylpoly-1,3,4-thiadiazole-5-(4H)-one,
0.25 part of an emulsifying combination (alkylarylpolyethylene glycol, alkylaryl sulphonate, calcium salt),
50 parts of kieselguhr,
24.75 parts of calcium sulphate (aqueous).

The active substance is intimately mixed with the emulsifier and the kieselguhr, and then the calcium sulphate is mixed in. A sprinkling agent is obtained which is particularly suitable for soil disinfection.

WETTABLE POWDER

To produce (a) a 50% and (b) a 10% wettable powder, the followng components are used:

(a)

50 parts of 2-(2'-methoxy-ethoxy)-4-(dimethoxy-phosphinothioyl)-1,3,4-thiadiazole-5(4H)-one,
5 parts of naphthalene sulphonic acid/benzene sulphonic acid/formaldehyde condensate,
5 parts of Champagne chalk,
20 parts of kieselguhr,
15 parts of kaolin,
5 parts of oleoyl methyl tauride sodium salt.

(b)

10 parts of 2-methoxy-4-(dimethoxy-phosphinothioyl)-1,3,4-thiadiazole-5(4H)-one,
3 parts of a mixture of the sodium salts of saturated fatty alcohol sulphates,
5 parts of naphthalene sulphonic acid/formaldehyde condensate,
82 parts of kaolin.

The active substances are intimately mixed with the additives in suitable mixers and milled on corresponding mills and rollers. Wettable powders are obtained which can be diluted with water to any concentration desired. Such suspensions can be used for both soil disinfection and to combat ticks in pets and domestic animals.

EMULSION CONCENTRATE

To produce a 25% emulsion concentrate, 25 parts of 2-propoxy-4-(dimethoxy-phosphinothioyl)-1,3,4-thiadiazole-5(4H)-one,
2.5 parts of epichlorohydrin,
5 parts of an emulsifying combination (alkylaryl polyethylene glycol/alkylaryl sulphonate, calcium salt),
67.5 parts of xylene are mixed together. This concentrate can be diluted with water to form emulsions having concentrations suitable for the protection of plants and stores. In particular, such emulsions are suitable for combatting ticks in pets and domestic animals.

I claim:
1. A 1,3,4-thiadiazole-5(4H)-one of the formula

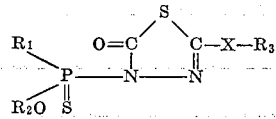

wherein
$R_1$ is lower alkyl, lower alkoxy, lower alkoxy substituted by lower alkoxy or halogen, or phenyl;
$R_2$ is lower alkyl, or lower alkyl substituted by lower alkoxy or halogen;
$R_3$ is an alkyl group having from 1 to 6 carbon atoms which can be substituted by lower alkoxy or lower alkylthio; and
X is oxygen or sulfur.

2. A 1,3,4-thiadiazole-5(4H)-one of the formula

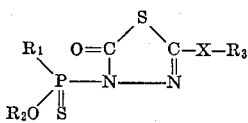

wherein
$R_1$ is methyl, methoxy, ethoxy, isopropoxy, methoxyethoxy, chloro-ethoxy or phenyl;
$R_2$ is methyl, ethyl, isopropyl, methoxy-ethyl, or chloroethyl;
$R_3$ is lower alkyl with 1 to 6 carbon atoms, lower alkoxy-lower alkyl with 2 to 6 carbon atoms, or lower alkylthio-lower alkyl with 2 to 6 carbon atoms; and
X is oxygen or sulfur.

3. A compound as defined in claim 1 wherein $R_1$ is methoxy, $R_2$ is methyl, $R_3$ is methyl, and X is oxygen.
4. A compound as defined in claim 1 wherein $R_1$ is methoxy, $R_2$ is methyl, $R_3$ is propyl, and X is oxygen.
5. A compound as defined in claim 1 wherein $R_1$ is methoxy, $R_2$ is methyl, $R_3$ is 2-methoxyethyl, and X is oxygen.
6. A compound as defined in claim 1 wherein $R_1$ is ethoxy, $R_2$ is ethyl, $R_3$ is methyl, and X is oxygen.
7. A compound as defined in claim 1 wherein $R_1$ is ethoxy, $R_2$ is ethyl, $R_3$ is ethyl, and X is oxygen.
8. A compound as defined in claim 1 wherein $R_1$ is ethoxy, $R_2$ is ethyl, $R_3$ is methyl, and X is sulfur.
9. A compound as defined in claim 1 wherein $R_1$ is ethoxy, $R_2$ is ethyl, $R_3$ is isopropyl, and X is oxygen.
10. A compound as defined in claim 1 wherein $R_1$ is ethoxy, $R_2$ is ethyl, $R_3$ is propyl, and X is oxygen.
11. A compound as defined in claim 1 wherein $R_1$ is ethoxy, $R_2$ is ethyl, $R_3$ is ethyl, and X is sulfur.
12. A compound as defined in claim 1 wherein $R_1$ is ethoxy, $R_2$ is ethyl, $R_3$ is isopropyl, and X is sulfur.
13. A compound as defined in claim 1 wherein $R_1$ is ethoxy, $R_2$ is ethyl, $R_3$ is isopropoxyethyl, and X is oxygen.

References Cited

UNITED STATES PATENTS 3,202,673   8/1965   Metivier et al. _____ 260—306.7

ALTON D. ROLLINS, Primary Examiner

U.S. Cl. X.R.

424—200, 187; 260—455, 923